United States Patent [19]
Peacock et al.

[11] Patent Number: 5,764,922
[45] Date of Patent: Jun. 9, 1998

[54] I/O SYSTEM FOR OFF-LOADING OPERATING SYSTEM FUNCTIONS

[75] Inventors: Richard Browning Peacock, Frazer; Philip Arthur Murphy, King of Prussia; David Ross Missimer, Malvern, all of Pa.

[73] Assignee: Unisys Corporation, Blue Bell, Pa.

[21] Appl. No.: 926,568

[22] Filed: Nov. 4, 1986

[51] Int. Cl.⁶ ........................................... G06F 13/20
[52] U.S. Cl. .................. 395/275; 364/238.3; 364/DIG. 1
[58] Field of Search ...................... 364/200 MS File, 364/900 MS File; 395/325, 650, 275

[56] References Cited

U.S. PATENT DOCUMENTS

| | | | |
|---|---|---|---|
| 3,432,813 | 3/1969 | Annunziata et al. | 364/200 |
| 3,447,135 | 5/1969 | Calta et al. | 364/200 |
| 4,024,508 | 5/1977 | Bachman et al. | 364/200 |
| 4,047,161 | 9/1977 | Davis | 364/200 |
| 4,080,649 | 3/1978 | Calle et al. | 364/200 |
| 4,149,243 | 4/1979 | Wallis | 364/200 |
| 4,384,324 | 5/1983 | Kim et al. | 364/200 |
| 4,394,727 | 7/1983 | Hoffman et al. | 364/200 |
| 4,428,043 | 1/1984 | Catiller et al. | 364/200 |
| 4,432,051 | 2/1984 | Bogaert et al. | 364/200 |
| 4,494,194 | 1/1985 | Harris et al. | 364/200 |
| 4,636,947 | 1/1987 | Ward | 364/200 |
| 4,642,756 | 2/1987 | Sherrod | 364/200 |
| 4,736,318 | 4/1988 | Delyani et al. | 364/200 |
| 4,779,194 | 10/1988 | Jennings et al. | 364/200 |
| 4,796,178 | 1/1989 | Jennings et al. | 364/200 |
| 4,980,824 | 12/1990 | Tulpule et al. | 395/650 |
| 5,060,140 | 10/1991 | Brown et al. | 395/325 |

*Primary Examiner*—Thomas G. Black
*Assistant Examiner*—Maria N. Von Buhr
*Attorney, Agent, or Firm*—Nathan Cass; Mark Starr

[57] ABSTRACT

An I/O system where there is provided a Task Control Processor which provides for the scheduling of the different central processors for the highest priority processes to be run. When an initiate I/O operation is detected, the respective processor is released from the process that it is currently running and can be assigned to the next highest priority process. When the requested I/O operation has been completed, the Task Control Processor is signalled so that the Task Control Processor can put the requesting process back into the priority list of processes to be run by the main central processors.

7 Claims, 7 Drawing Sheets

I/O SYSTEM FOR OFF-LOADING OPERATING SYSTEM FUNCTIONS

RELATED U. S. PATENT APPLICATIONS

U. S. patent applications directly or indirectly related to the subject application are the following:

Ser. No.: 926,567, filed Nov. 4, 1986 by Richard B. Peacock, et al., entitled: Queuing Mechanism for Linking Peripheral Device Operations now abandoned.

Ser. No.: 926,588, filed Nov. 4, 1984 by Richard B. Peacock, et al., entitled: Path Selection Mechanism for a Large Data Processing I/O System now abandoned.

Ser. No.: 926,738, filed Nov. 4, 1986 by Richard B. Peacock, et al., entitled: Disk Caching Mechanism for a Multi-Disk Drive System now abandoned.

BACKGROUND OF THE INVENTION

FIELD OF THE INVENTION

This invention relates to an input/output system for a very large computer system and more particularly to such an I/O system wherein the I/O software functions are implemented in the I/O hardware system.

DESCRIPTION OF THE PRIOR ART

A very large multi-processing system or a very large single processing system adapted for multi-programming requires large amounts of data in its various computations and thus is provided with a hierarchy of storage units ranging from main memory to bulk storage devices such as disk drives to peripheral devices such as tape drives, and the like. The system is provided with I/O controllers which control the data transfer from the peripheral devices to the disk storages or from the peripheral devices and the disk storages to main memory. However, in such prior art systems the central processors are required to decode the I/O instructions and send the respective control signals to the I/O controllers and this takes up an unduly large amount of the processors's execution time. Examples of such prior art controllers are disclosed in the Annunziata et al. U. S. Pat. No. 3,432,813 and the Calta et al. U. S. Pat. No. 3,447,135.

Attempts have been made to free the central processor from this I/O execution so that the central processor can spend more time on user jobs by supplying a separate general purpose processor to operate independently in the control of input/output data transfers. However, there must be some communication between the two processors in order to assure that the data required by the main central processor is received in its main memory prior to the central processor utilizing that data.

Input/output operations include more than just data transfers between the periphery and main memory. For example, the I/O system must control such non-data transfer operations as rewinding tape reels and the like. Furthermore, in very large data processing systems, there are a number of different buses and peripheral controllers that may be chosen to optimize through-put from the periphery to main memory and vice versa. In addition, particularly in regard to disk drives, a cache memory is provided to store the most recently accessed data segments in that cache, which data segments are more likely to be accessed again shortly. However, these disk functions are handled by an operating system running on a central processor, requiring the processor to spend additional time that could be employed in running user jobs or tasks.

Statistical studies indicate that a major portion of each processor's time, in a multi-processing system, is employed in executing operating system functions. From these studies, it is estimated that the overhead of such management functions has been anywhere between 10 percent and 50 percent, and occasionally even higher. Furthermore, a goodly portion of the time that the corresponding central processor is executing operating system functions is employed in establishing process priority, performing functions on events (to be defined below) and initiating input/output operations. If these functions could be removed from the operating systems, then the through-put of the data processing system should be substantially enhanced.

It is then an object of the present invention to provide an improved input/output system that in turn increases the through-put of the data processing system.

It is another object of the present invention to provide an improved input/output system which allows the removal from the operating system of those functions which require a goodly percentage of the central processor's time.

It is still a further object of the present invention to provide an improved input/output system having facilities for performing those functions that would otherwise be a part of the operating system stored in main memory.

SUMMARY OF THE INVENTION

In order to accomplish the above-identified objects, the present invention resides in an input/output system for a large data processing system which includes an I/O Processor having a plurality of control stores therein for controlling different portions of the I/O functions such as were described above. The I/O processor is signalled by an initiating instruction created by and sent from one of the central processors in the system when that central processor detects an I/O operation. Also, in the I/O system of the present invention, there is provided a Task Control Processor which provides for the scheduling of the different central processors for the highest priority processes to be run. When an initiate I/O operation is detected, the respective processor is released from the process that it is currently running and can be assigned to the next highest priority process. When the requested I/O operation has been completed, the Task Control Processor is signalled so that the Task Control Processor can put the requesting process back into the priority list of processes to be run by the main central processors.

The I/O Processor also maintains a table of different combinations of buses and peripheral controllers that may be used to access a given peripheral unit. In addition, a portion of main memory is assigned as a single cache so that when the I/O Processor accesses a data segment in a disk drive, the entire disk drive track being accessed is read into the assigned cache portion of main memory since following data requests would most likely be made therefrom.

It is then a feature of the present invention to provide an improved input/output system that relieves the operating systems of a very large data processing system of much of the I/O functions thereby allowing central processors of the system to be utilized for running user tasks and processes.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

Figure 1:
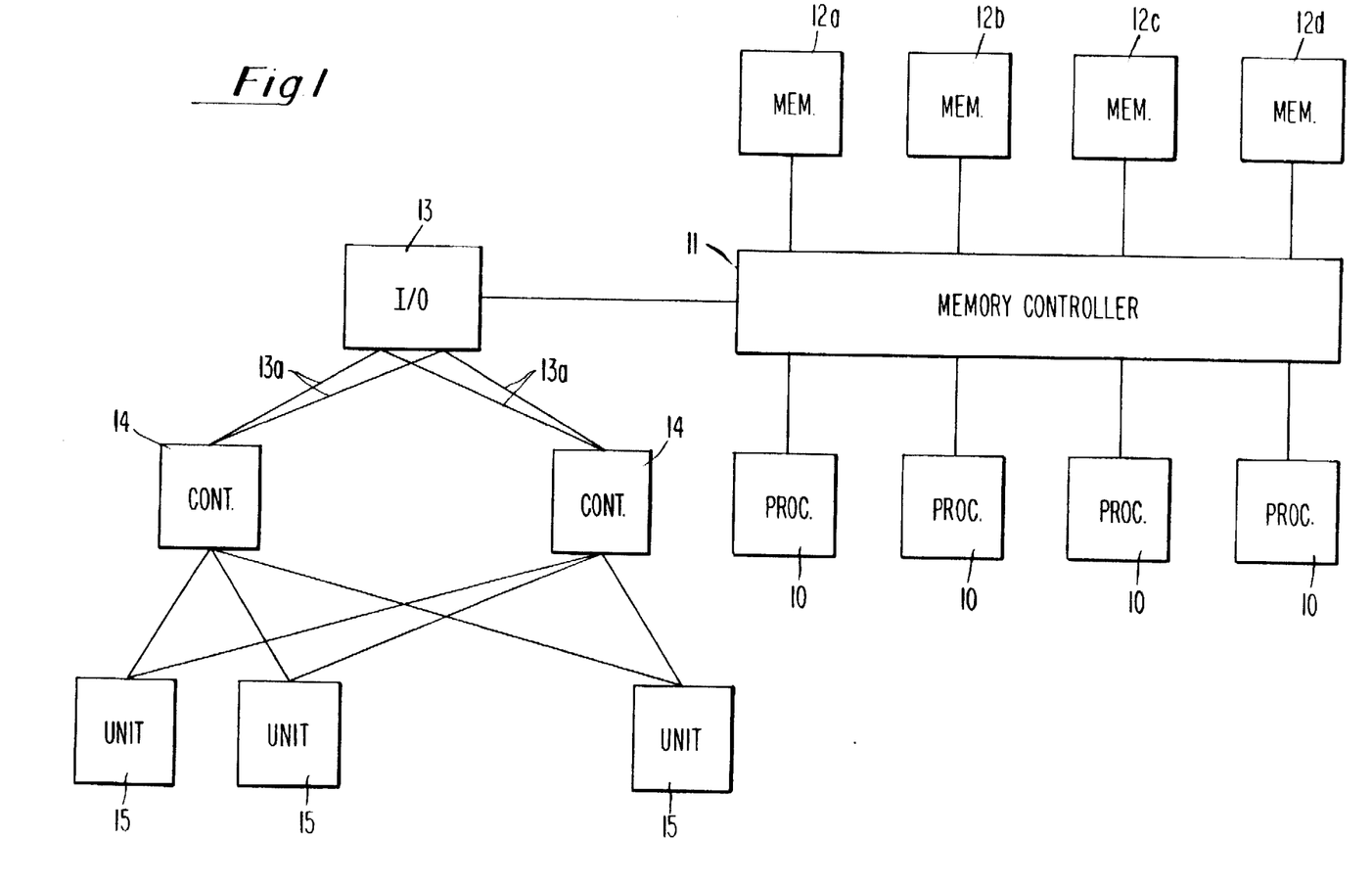
FIG. 1 is a block diagram of a system employing the present invention.

A system employing the present invention is illustrated in FIG. 1. As shown therein, this system is a very large multi-processing system having a plurality of central processors 10 which are coupled to a plurality of main memory modules 12a–d by way of memory controller 11 which allows any processor to address any memory module.

More specifically, the present invention resides in I/O system 13 which controls all communication and data transfer between peripheral units 15 and main memory modules 12a–d. As will be discussed further, I/O 13 can also communicate with respective central processors 10 by way of memory controller 11. It is to be noted in FIG. 1, that there are a plurality of controllers 14 coupled between respective peripheral units 15 and I/O system 13 by way of a plurality of different buses 13a. That is to say, that a given peripheral unit 15 can be accessed by I/O system 13 by way of alternative combinations of buses 13a and controllers 14. Peripheral units 15 may include any type of peripheral device or storage including large disk drives in which are stored the operating systems of the data processing system of FIG. 1 and also critical user data.

Figure 2:
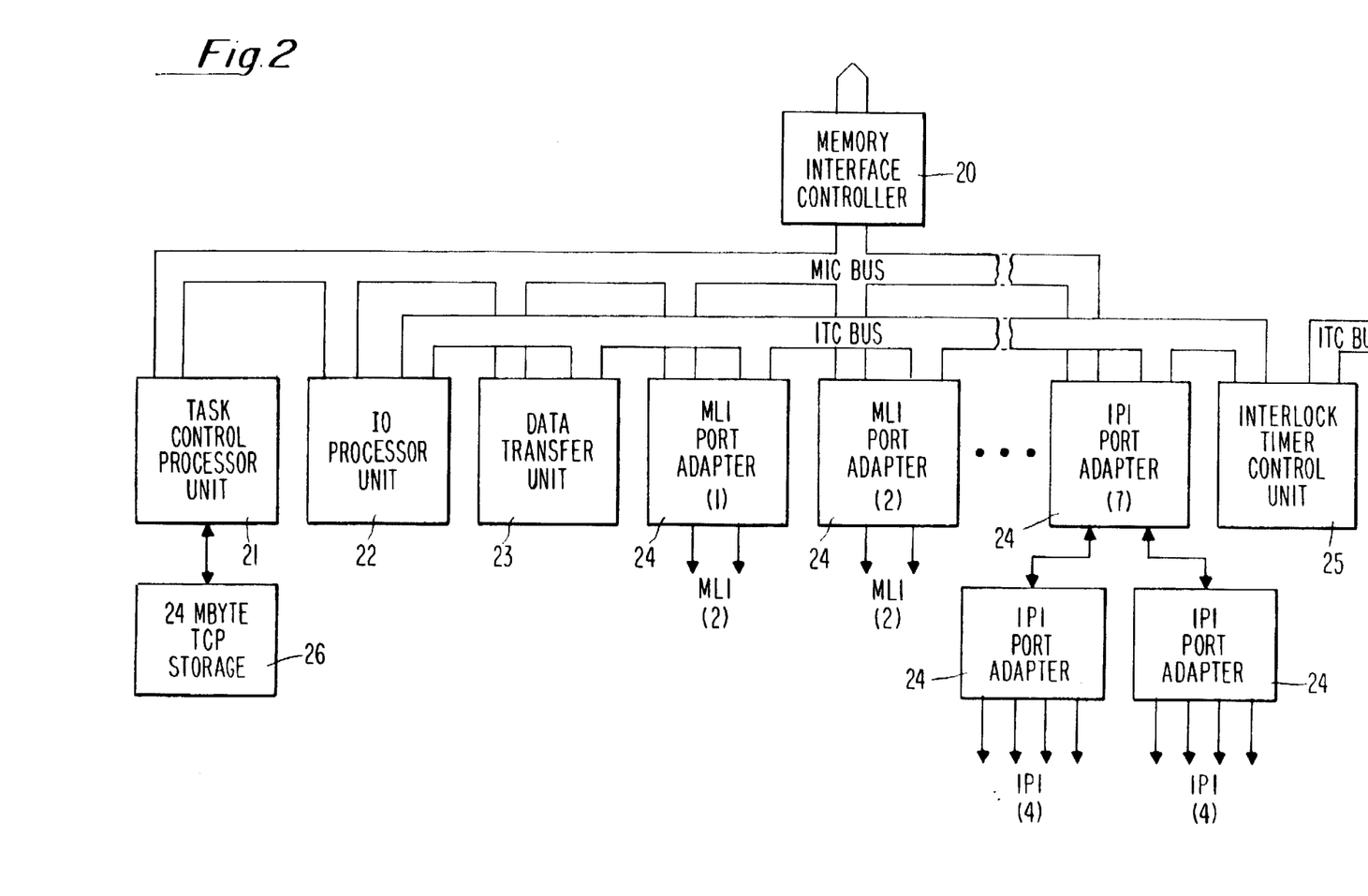
FIG. 2 is a block diagram of the input/output system of the present invention.

I/O system 13 of FIG. 1 is shown in more detail in FIG. 2 and contains a number of different units that interface by way of memory interface controller 20 with memory controller 11 of FIG. 1. As shown in FIG. 2, I/O system 13 includes Task Control Processor 21 which handles all process scheduling on respective central processors 10 of FIG. 1 and also keeps track of various events upon which different processes might be waiting. I/O processor 22 is the heart of the present invention and performs all the functions that have been referred to above and will be more fully described below. Data transfer unit 23 is employed to move data between different areas of memory to other areas of memory and is specifically useful in the disk cache mechanism of the present invention. Port adapters 24 are basically bus drivers for the respective buses 13a of FIG. 1 although they may employ different protocols. Interlock timer control 25 distributes interrupts to the various buses and also provides a queue locking mechanism by which it is guaranteed that shared queues (PQ, BQ) are not corrupted by multiple simultaneous access. Task Control Processor 21 is described in detail in the Jennings et al. application U. S. Ser. No. 787,669, filed Oct. 15, 1985 now U.S. Pat. No. 4,796,178 and assigned to the same assignee as the present invention.

As has been indicated above, the function of the present invention is to relieve the operating systems and the respective central processors 10, which execute those operating systems, of all I/O operations so that central processors 10 will have more time for the execution of user jobs. When a given central processor 10 is executing a process from one of memory modules 12a–d and encounters an I/O operation, the corresponding I/O control block is created and the I/O instruction is sent to I/O system 13 by way of memory controller 11 and the processor 10 is released to begin executing the next highest order process from one of memory modules 12a–d. When the I/O operation has been completed, the requesting process is then rescheduled in a priority list of processes for further execution by the next available central processor 10. Completing the description of FIG. 2 TCP storage 26 provides a back-up storage for task control processor 21.

Figure 3:
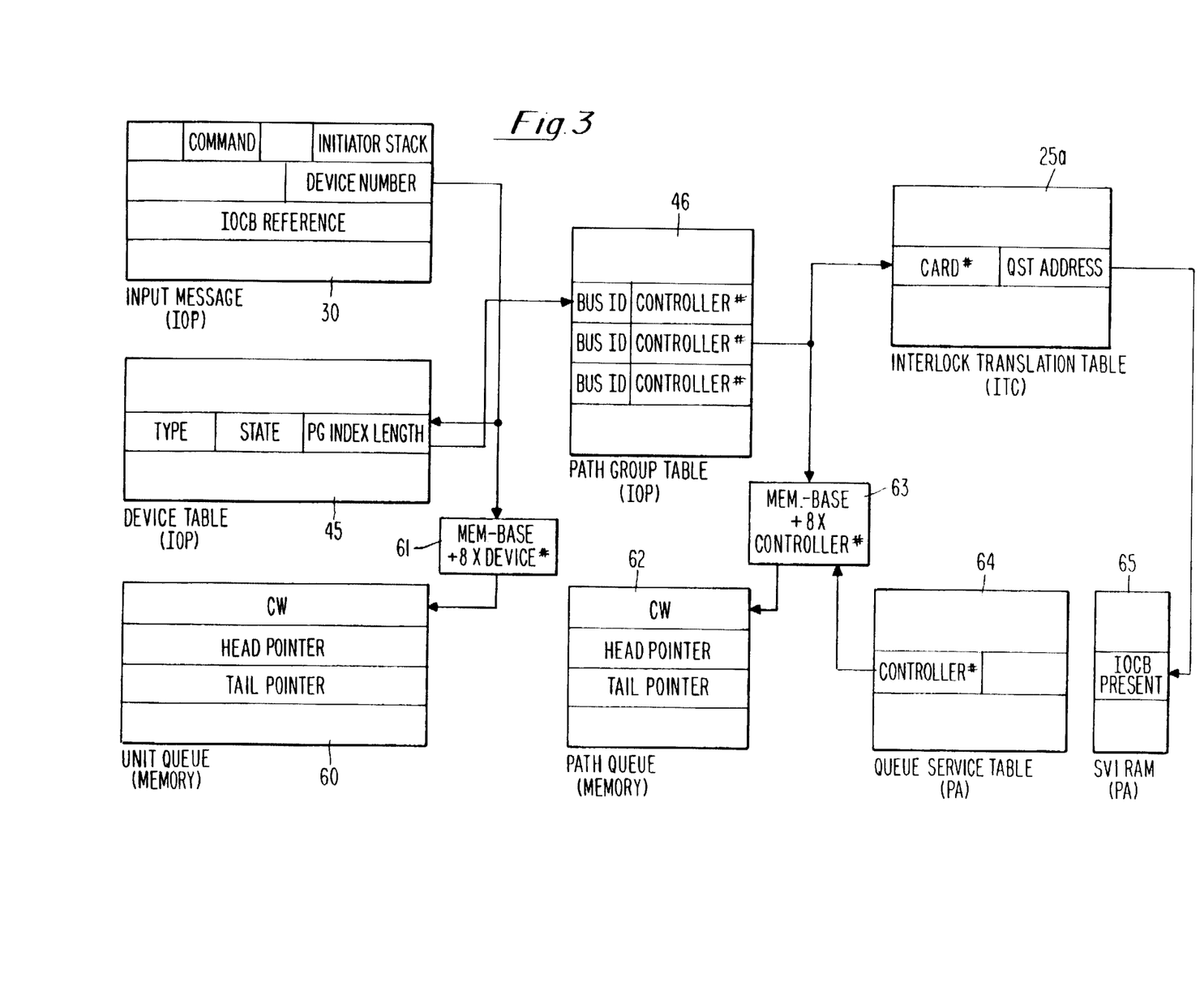
FIG. 3 is a diagram of the relation between the various tables employed by the present invention which tables reside in both the I/O Processor, main memory and in port adapters.

Before describing the details of I/O processor 22 of FIG. 2, a description will first be given of the data structure linkages or linkages between tables employed by the I/O processor which are illustrated in FIG. 3. The I/O start instruction or ASYNC-SCHEDULE command is received by input message buffer 30 of FIGS. 3 and 4. In FIG. 3, there is only one such command which consists of four words. The first word contains an operation command and also an indication of the initiating process which in the system of the present invention and in the above-described Jennings et al. application are also referred to as a stack. The second word of the message or instruction contains a device number which identifies the device to be employed by the I/O operation. The third word contains a reference to an I/O control block (IOCB) which is created by a central processor and stored in main memory as will be more fully described below. The fourth word contains the time of the command initiation.

Figure 4:
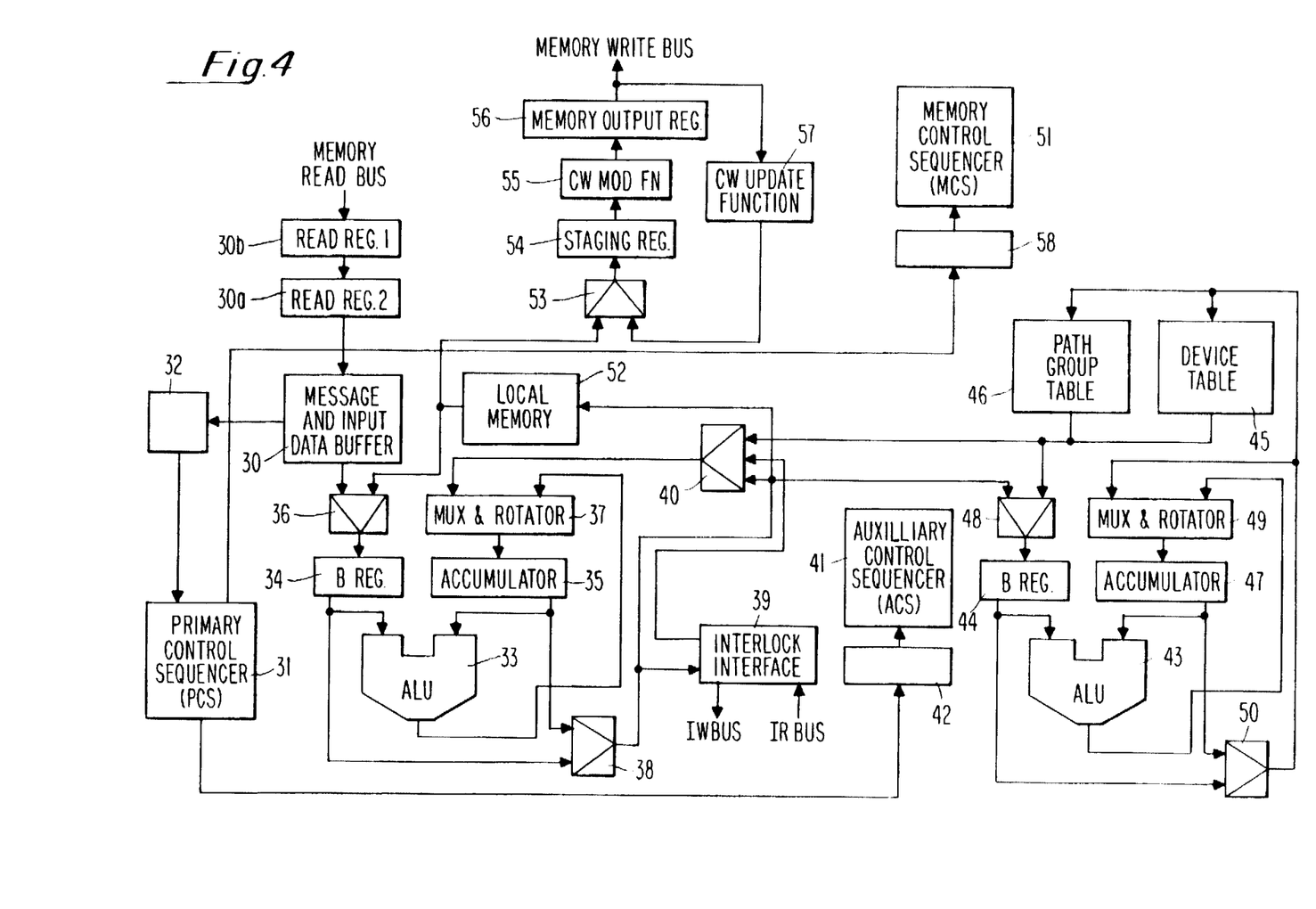
FIG. 4 is a schematic diagram of the I/O Processor of FIG. 2.

The I/O processor then takes the device number which addresses device table 45 of FIGS. 3 and 4 which contains an entry for each device in the system which entry includes the current status of that device and if the device is not available or not in an idle state, then the device control block is stored in a device queue in main memory until the device is idle. As employed in the present application, the term "device" is employed to mean either a bus 13a of FIG. 1, a controller 14 of FIG. 1, or a peripheral unit 15. If the device is idle, then a reference is obtained to path group table 46 of FIGS. 3 and 4 which specifies which controllers and associated buses are to be employed to access the device which is normally a peripheral unit. In FIG. 3, the entry in path group table 46 indicates that three controllers can be used. Controllers servicing a unit have equal priority, and the I/O Processor IOP attempts to keep the load seen by each controller well balanced by its path selection algorithm. Buses servicing a controller are listed in the path group entry for that controller in priority order. Once the bus and controller combination for a given device (usually a unit) is determined, reference is made to interlock translation table 25a of interlock timer control ITC unit 25 of FIG. 2. The proper path queue is locked via ITC. The control block is enqueued into the path queue. The path queue is unlocked and the I/O bus is interrupted again via the ITC.

When the device was selected, reference was made back to the indirect reference queue for that unit in memory and the contents of unit queue 60 of FIG. 3 just show that indirect reference or Q header. This in turn allows the I/O processor to fetch the appropriate control blocks from main memory which are passed to the I/O processor which could not be executed immediately. Similarly, after the path group has been selected, reference is made to path queue 62 which again contains a Q header pointing to the control blocks for the selected bus or controller. These control blocks or parts of them are passed on to the selected controller and so forth until the I/O operation is complete, in which case they are passed back to memory. When the I/O operation has been finished, the control blocks are passed back to main memory and task control processor 21 of FIG. 2 reschedules the requesting process. Completing the description of FIG. 3, arithmetic logic unit 61 and 63 serve to calculate the respective device and controller control block addresses. As indicated in FIG. 3, the respective unit queues 60 and path queues 62 reside in main memory while the the queue service table 64 including RAM 65 which holds the corresponding service interrupt bits reside in the port adapters 24 of FIG. 2.

DETAILED DESCRIPTION OF THE INVENTION

A block diagram of the I/O processor of the present invention is illustrated in FIG. 4. It is to be noted therein that this processor is controlled by three different control sequencers or control stores 31, 41, and 51, the purpose of which are to control different portions of the I/O processor in a concurrent manner. Among the advantages of this, I/O processor of FIG. 4 can send a message acknowledgment signal to a requesting central processor of FIG. 1 before the processing of that message is actually begun and thus speeds up the release of the requesting central processor so that it may be assigned to other user tasks.

Memory control sequencer 51 controls the main input bus or memory read bus by which messages are transferred to message and input data buffer 30 by way of read registers 30a and 30b. In addition, primary control sequencer 31 controls main arithmetic logic unit 33 which is used to calculate device, unit and other addresses according to the particular command being implemented. Inputs to ALU 33 are by way of B register 34 and accumulator 35 which in turn are supplied by multiplexer 36 and multiplexer and rotator 37. The output of ALU 33 is used to update results in local memory; to update the rotator for field manipulation; to drive the interlock interface; and to send parameters to the auxiliary control sequencer via its B register. The output from ALU 33 is sent to multiplexer and rotator 37 and hence to accumulator 35 either for further manipulation or for transmission to interlock interface 39 or to save results in local memory by way of multiplexer 38. Multiplexer 38 may also receive information from B register 34 when that information is to be sent to interlock interface 39.

Referring back to FIG. 2, the various units therein are connected by two buses, namely memory interface controller bus MIC which communicates with main memory by way of memory controller 11 of FIG. 1 and also interlock timer control bus ITC which communicates with, among other things, port adaptors 24 and interlock timer control unit 25. In FIG. 4, I/O processor communicates with MIC bus by way of memory read bus and message and input data buffer 30 and also memory write bus by way of memory output register 56. The I/O processor of FIG. 4 communicates with the interlock timer control bus ITC by way of interlock interface 39.

Continuing on with the discussion of FIG. 4, the I/O processor shown therein is provided with an auxiliary arithmetic logic unit 43 and appropriate input and output registers and multiplexers for off-loading of certain tasks by primary control sequencer or control store 31 to auxiliary ALU 43 and associated registers which are under control of auxiliary control sequencer or control store 41. To transfer tasks from primary control store 31 to auxiliary control store 41, primary control store 31 addresses auxiliary control store 41 by inserting operation codes and associated parameters into spare areas of the path group table memory, and setting the auxiliary sequencer interrupt. When the auxiliary sequencer has completed the requested function, it writes its results into a spare area of the path group table memory, and resets the auxiliary sequencer interrupt. The primary sequencer then reads the results directly. Auxiliary control store 41 and associated logic is employed to complete the task of determining the status of a selected device stored in device table 45 and also to select the appropriate bus controller pair as selected by addressing path group table 46. It is also employed in the arithmetic calculations required for disk caching.

The mechanisms of the I/O processor of FIG. 4 described thus far have dealt primarily with handling the receipt of a start I/O instruction or more specifically an ASYNC-SCHEDULE instruction and the selection of the appropriate device or unit and corresponding bus-controller combination for the subsequent transfer of an I/O control block from main memory to the selected controller and port adaptor which drives the bus.

To handle information transfer from I/O processor of FIG. 4, memory control sequencer or control store 51 is provided to control this transfer concurrently with primary control store 31 but in synchronization therewith since both control stores 31 and 51 access local memory 52. This synchronization is accomplished through two separate shared hardware queue structures within local memory 52. The local memory is designed to run at twice the frequency of the surrounding logic, so that during each machine cycle, the memory control sequencer can read a given location and the primary control sequencer can either read or write a given location. The Primary Control Sequencer (PCS) makes requests of the Memory Control Sequencer (MCS) by writing entries into the queue areas (fetch Q or store/MSG Q) by way of register 58. MCS services the requests by reading the queues and accessing the data in Local Memory LM.

In FIG. 4, data and information transfer from the port adapters and other units of FIG. 2 is received from interlock interface 39 by way of local memory 52 which serves a variety of purposes. Information transfer to main memory is by way of multiplexer 53, staging register 54, command modification unit 55 and memory output register 56. The modified commands generated by command modifier unit 55 are then returned back by way of command update function unit 57. Completing the description of FIG. 4, registers 32 and 42 are buffer registers respectively to the PCS and the ACS. Multiplexor 40 receives information from multiplexer 38 as well as interlock interface 39 and path group table 46 and device table 45. B register 44 serves to receive data from multiplexer 48 and to supply data to ALU 43 which also receives data from multiplexer and rotator 49 by way of accumulator 47. Multiplexer 50 receives data directly from B register 44 and accumulator 47 for return to multiplexer and rotator 49 and device table 45.

Reference has been made above to the storing of device control block messages in a queue in memory when the device being requested is not idle or otherwise not available, to queue headers and to I/O control blocks IOCB). These will now be more fully described in relation to FIGS. 5A–D. These various information structures represent structures stored in a portion of main memory set aside as an I/O work space which is reserved for the system of the present invention.

Figure 5A:
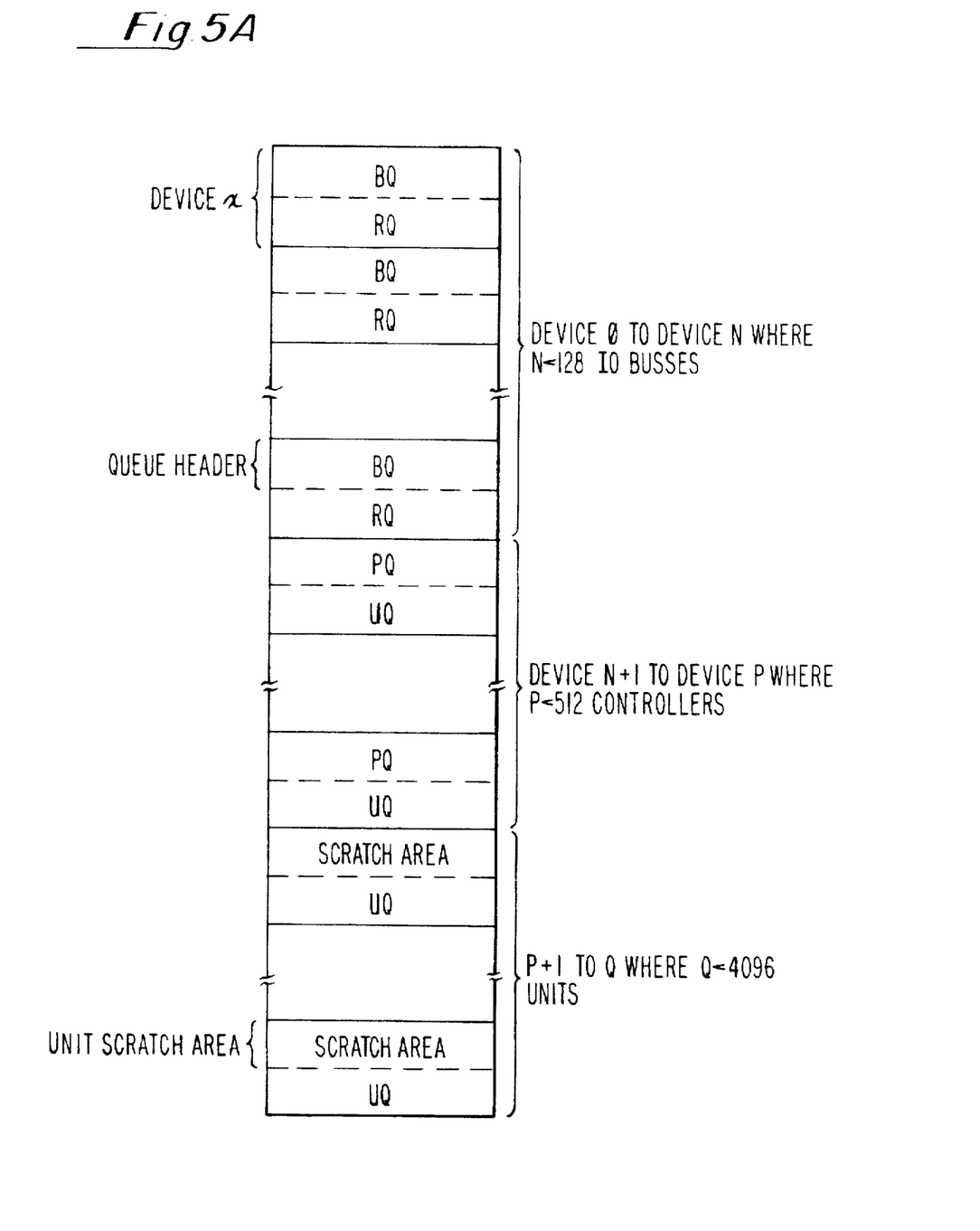
FIGS. 5A-D represent other tables in memory employed by the present invention and the relation therebetween.

FIG. 5A is a diagram of a table in main memory of device sections, one for each device in the system where, as was mentioned above, the device may be one of the I/O buses 13a of FIG. 1 (or more particularly one bus of the port adapters 24 of FIG. 2 which drive the corresponding buses), one of controllers 14 of FIG. 1 or one of peripheral units 15 of FIG. 1. As indicated in FIG. 5A, there may be up to 128 I/O buses, up to 512 (less the number of I/O buses) controllers with the remaining devices being peripheral units up to 4,096 less the number of I/O buses and controllers.

Each device section includes two queue headers which, as more thoroughly described below, contain pointers or memory addresses to different I/O control blocks (IOCB) there being one such block for each operation currently being performed by a device in the system. An exception to this is that the unit device sections only contain one such queue header with the other portion of that section being used as a scratch pad area.

Figure 5B:
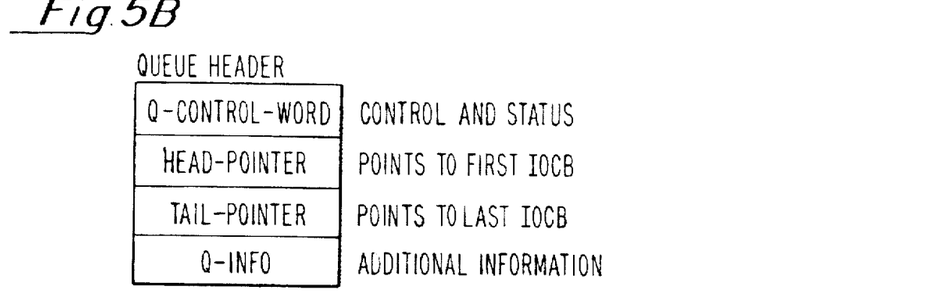
Figure 5C:
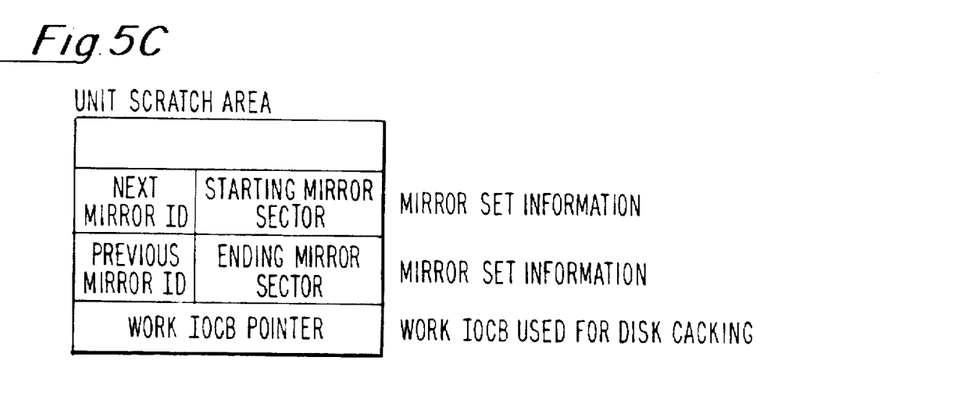

The general format of each queue header is illustrated in FIG. 5B and the unit scratch area format is illustrated in FIG. 5C. In FIG. 5B, the queue header is made up of four control words. The first word contains control and status information. The second word is a pointer or an address to main memory at the beginning of the first I/O control block for that particular device. The third word is a pointer or address to main memory of the last or most recent I/O control block so that these two pointers indicate the beginning and the end of a particular queue of linked together control blocks for different jobs or tasks that have been requested of the device in question. This will be more thoroughly described in relation to FIG. 5D.

Finishing the description of FIG. 5A, the I/O bus device areas include a bus queue header into which operators for controlling the corresponding I/O bus are enqueued. These device areas also include a queue header for controlling the transfer of the results of the device operation via the corresponding port adapter. Each of the controller device sections includes a path queue header for passing the corresponding control block to the respective controller that was selected in the bus-control combination as was described above and a unit queue header which points to control blocks pending for the controller itself. Such path queue headers and unit queue headers were described above in relation to FIG. 3.

Figure 5D:
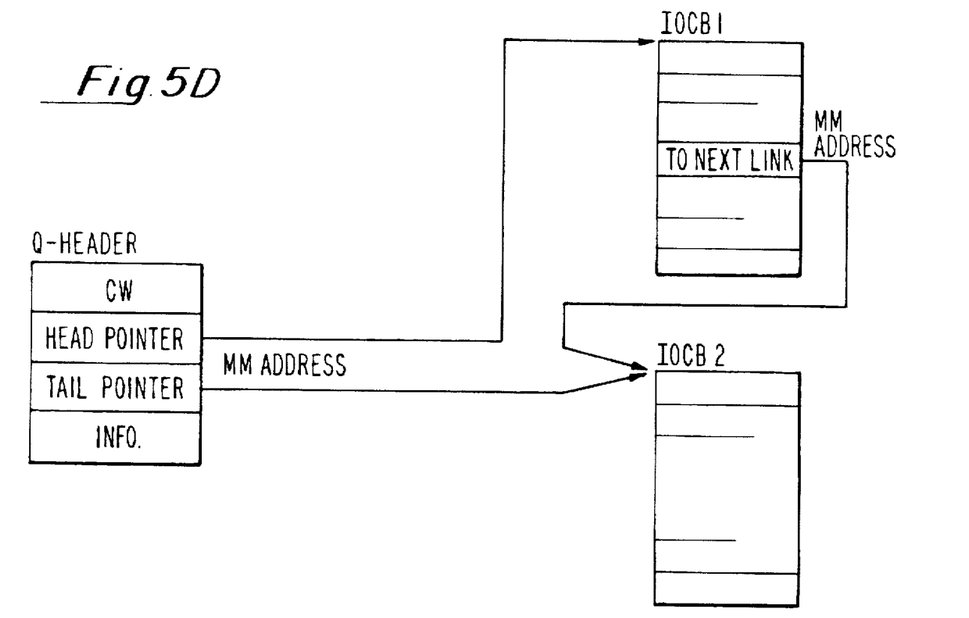

Turning now to FIG. 5D, the queuing mechanism of the present invention for linking together of control blocks for different jobs or tasks requested on the particular device will now be described. As was indicated above, most of the requests for devices are requests for peripheral units 15 of FIG. 1 and there is an I/O control block for each job or task that has been requested of the respective devices.

When an input message comes into input message buffer 30 of FIGS. 3 and 4, it specifies the device number and also a reference or memory address to the particular control block for the job to be performed on that device. If the device is idle, the control block is fetched; path selection is performed; the IOCB is linked into the selected controller's path; and the I/O bus servicing that controller is interrupted via the ITC mechanism already described. If the device is not available, then the control block reference will be inserted as a tail pointer in the particular device queue header as indicated in FIG. 5D. It will also be inserted as the head pointer if the unit queue was previously empty. A field in the unit queue control word indicates the device is idle. As additional particular requests for that device come in, then the second requested control block address is inserted as the next link memory address in the head I/O control block and also in the tail pointer of the particular device queue header, as illustrated in FIG. 5D. In this manner, many requests for a particular device can be queued with the queue mechanism of the present invention.

Sometimes the various I/O control blocks, such as those represented in FIG. 5D, are employed by the I/O processor of FIG. 4 to communicate commands to the various devices to essentially cause transitions of the device. That is to say, a device can be in one of four states: free, saved, ready, or suspended. Examples of device management procedures implemented by the processor of FIG. 4 include: ACQUIRE which, if successful, transitions a device from a free state to a saved state; READY, which if successful, transitions a device from saved to ready; SUSPEND which, if successful, transitions a device from ready to suspended; SAVE which, if successful, transitions a device from ready to saved; and FREE which, if successful, transitions a device from a saved state to a free state. These procedures can return to the operating system with an error for various reasons, including that the specified device was not in the proper initial state. The state of every device is maintained in the device table 45 of FIG. 4 within the IOP.

Figures 6, 7:
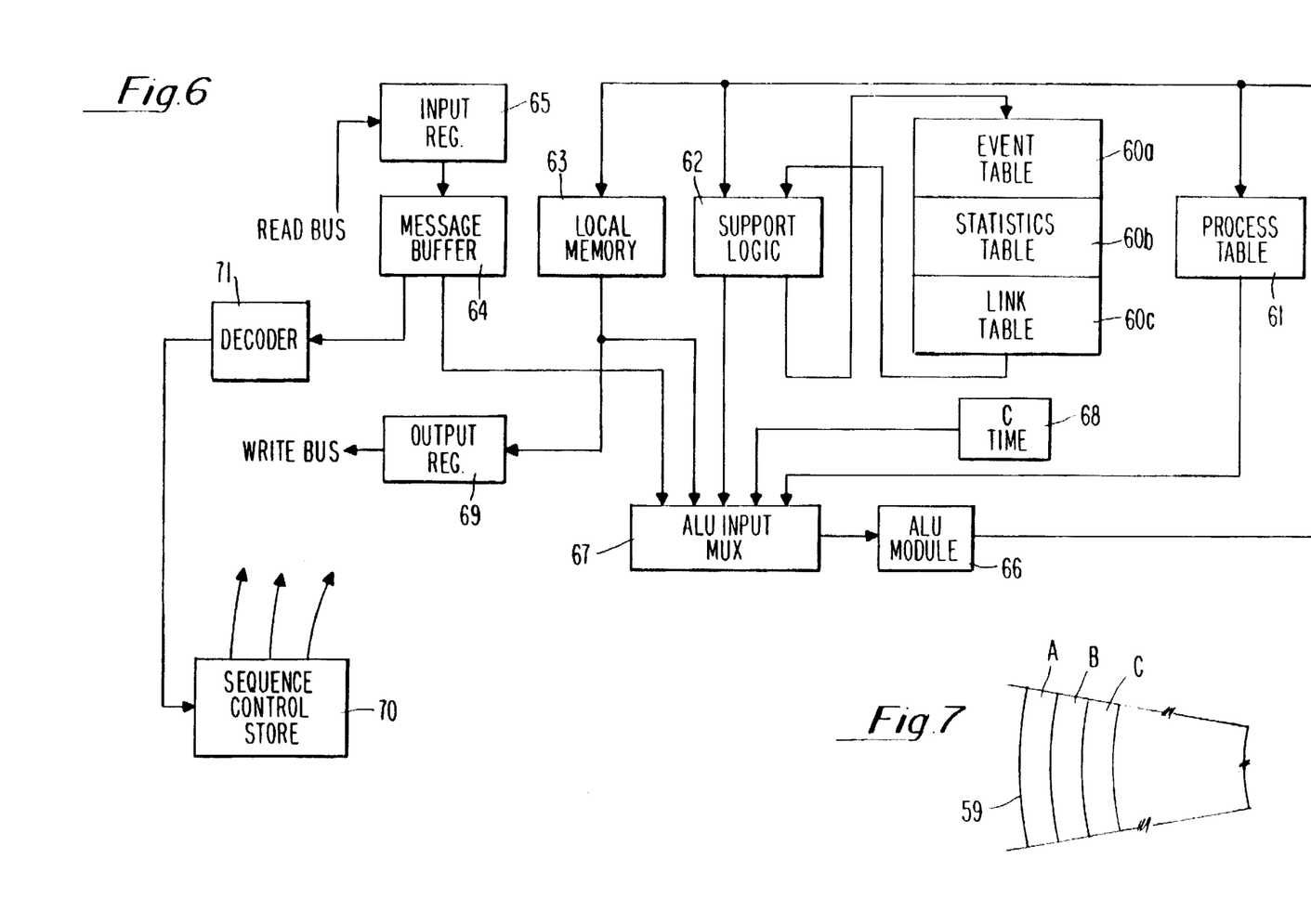
FIG. 6 is a schematic diagram of the Task Control Processor of FIG. 2.
FIG. 7 is a diagram of a portion of a disk drive as employed by the present invention.

Referring back to FIG. 5C, certain functions that can be performed by the mechanism of the present invention as thus disclosed will now be described. One of these features is that of disk mirroring which is a technique in which more than one copy of critical data is kept on separate disk devices so, that even in the case of serious disk failure, the system will still be kept running. The I/O processor of FIG. 4 supports disk mirroring in two main ways. First, for a disk read to a mirrored set, it will select the best unit from among the mirrored set to which the request is to be forwarded. The major components of delay in completing disk access are: seek time, which is the time that the disk arm is moving to the proper cylinder or track; rotational latency, which is the time after the seek completed but before the data is actually under the read head of the disk; and data transfer, which is the time required to extract the requested data from the media. For those readers not familiar with disk mechanisms, a section of such a disk 59 is illustrated in FIG. 7 showing the individual tracks A, B, C . . . . The processor of FIG. 4 attempts to minimize the seek time for selecting a read unit from the mirrored set. The second way that the I/O processor supports disk mirroring is that on disk writes, the processor synchorizes all of the individual disk writes forming a single logical write, accumulating times and results into one and sending only one response back to the initiating user. To this end, the second and third words of the unit scratch area of FIG. 5C are employed.

Another feature implemented by the mechanism of the present invention is that of disk caching. In order to reduce the amount of time which I/O processes take, the processor of FIG. 4 implements a hardware managed disk cache in main memory. The only type of peripheral whose performance is critical to the overall system performance is the disk unit in which is stored the operating system, user data bases, and other frequently accessed information. The processor of FIG. 4 is allocated a very large area of system memory which it uses to keep copies of recently accessed disk tracks in the hope that further accesses will be made to the same track which is more often than not the case at hand. The advantage of this is that different access requests to a particular track on the disk unduly tie up the corresponding buses and controllers used to access the corresponding disk. Also I/O's which are disk cache hits can complete about three orders of magnitude faster than the physical disk accesses. To this end, the fourth word in the unit's scratch area of FIG. 5C is employed by the processor of FIG. 4.

As is described above in relation to FIG. 2, the I/O system of the present invention includes task control processor 21, which handles all process scheduling of the respective central processors 10 of FIG. 1 and also keeps track of various events upon which different processes might be waiting, including I/O operations. Thus, there is a certain cooperation between I/O processor 22 of FIG. 2 and task control processor 21 since some of the events upon which user processes may be waiting include I/O operations.

A functional diagram of task control processor 21 is illustrated in FIG. 6. The two principal functional elements shown therein are process table 61 and event table 60a. Process table 61 and process statistics table 60b contain the information as to the status of all tasks or processes scheduled to be run on the system of FIG. 1. In the described embodiment of the present invention, there can be 4K such tasks or processes running on the system at any one point in time.

The status information of the processes in process table 61 are arranged as a queue or a linked list of processes according to the priority of the processes involved. As was indicated above, such a task control processor is described in detail in the above referenced Jennings et al. U. S. patent application Ser. No. 787,669 now U. S. Pat. No. 4,796,178.

As used in the remaining portion of this application, the terms "task", "process", and "stack" are used as being synonymous where a stack is a natural physical location in main memory and the respective task or processes are independent of one another and occupy the corresponding stack space. Thus, the terms "stack number", "task number", and "process number" are used synonymously and are the actual addresses to process table 61 of FIG. 6 of the corresponding process status information.

Event table 60a is employed to contain information as to the status of various event designations (in the present application, I/O operations) called for by user processes running on the system. In the embodiment of FIG. 6, there may be a maximum of 512K such events being utilized at any one time. When a process being executed by a particular processor 10 of FIG. 1 requires an event designation, it requests the allocation of such a designation from the task control processor of FIG. 6 which then allocates an unallocated event designation to that process and sends an event token to be placed in main memory on top of the particular stack whose process requested the event designation. Event table 60a then upgrades the event information to indicate that the event has been allocated. The event token is made up of the event address to event table 60a and also certain coded bits to ensure that one of the processors 10 of FIG. 1 does not accidentally create its own event token. Event table 60a is also employed to maintain a linked list of various processes requesting a particular event that has already been allocated and assigns that event to the highest priority process requesting that event when the event is freed or liberated by its owning process.

An event designation does not specify the particular function for which the event was allocated. This is done by the requesting process. Event table 60a serves the purpose of maintaining the status of the event, e.g., whether it is available for allocation, whether it has occurred, what processes are waiting on it, etc.

Continuing on with the description of FIG. 6, support logic 62 is employed to insert information fields into event table 60a, statistics table 60b and link table 60c as well as to extract fields therefrom as required. Local memory 63 serves as an output buffer and also maintains a processor table which indicates which processes are currently running on the respective processors 10 of FIG. 1.

Message transmission to the other processors of FIG. 1 are by way of memory controller 11 of FIG. 1 from output register 69 of FIG. 6. Messages are received from controller 11 by way of input register 65 to message buffer 64. As indicated in FIG. 6, the various functional units thus described have inputs to arithmetic logic unit module 66 by way of arithmetic logic unit input multiplexer 67. Arithmetic logic unit module 66 is employed to compute process priorities as described above and also to form messages for transmission to other processors of the system. All of the functional units of FIG. 6 are under the control of sequence control store 70 and are activated by the receipt of an external processor request by message buffer 24, where the request command is decoded by control store 70. Completing the descripting of FIG. 6, local memory 63 serves to supply information to both output register 69 and ALU input multiplexor 67 which also receives a timing signal from clock 68. Decoder 71 receives a command from message buffer 64 and decodes it for sequence control store 70.

Task control processor 21 is designed to relieve the master control program of many of its most time consuming functions and, along with I/O processor 22 of FIG. 2, to relieve the master control program of most of the functions involved with I/O operations. Thus, in the present invention, when a processor is executing a particular user process, and encounters a reference to data not in main memory, it requests that task control processor 21 of FIG. 2 allocate an event token to that process and then initiates a procedure call for an I/O procedure for creating I/O start instruction or ASYNC/SCHEDULE command which is transferred to I/O processor 22 of FIG. 2 and message input data buffer 30 of FIG. 4. When the I/O process has been completed, primary control sequencer 31 creates a message which is sent from I/O processor 22 to task control processor 21. This in turn sets a particular bit in the particular event location of event table 60a which results in the awakening of all processes which are currently waiting on the designated event so that they may be rescheduled by the task control processor for execution by the next available processor 10 of FIG. 1 according to their priority with no central processor involvement.

Brief mention was made above to disk caching by which each time a segment is fetched from a disk, its entire track is read into main memory as there is a higher probability that later I/O requests will shortly access that same track. By maintaining the disk cache in main memory, for all the disks in the system, conflicts between requests for various buses 13a of FIG. 1 and controllers 14 thereof are greatly reduced. It should be noted, that in a very large data processing system of the type employing the present invention, the operating systems will not only be quite large so as to require many disks for permanent storage, but so too will critical user data bases such as customer bank accounts and the like which may be very frequently accessed or updated. It would not be unusual in such a situation where all of the peripheral units 15 of FIG. 1 were disk drives except for some tape units for off-loading the system.

Because of the major storage requirements for I/O transfers, a goodly portion of main memory is assigned for such I/O operations. Thus, in FIG. 1, memory module 12a may be assigned as the I/O work area described above, memories 12b and 12c would be assigned as the disk cache while the remaining memory modules would be assigned to user programs and data.

Mention will now be made of data transfer unit 23 in FIG. 2 which is employed solely for the purpose of transferring data segments to and from the disk cache in memory module 12b and the user data base in the user portion of the memory. For reasons of manufacturing economics, this unit will be a circuit board which is the same as that which embodies the I/O processor 22 and illustrated in detail in FIG. 4, except, in FIG. 4, the auxiliary control sequencer and the units under its control as well as device table 45 and path group table 46 are not employed. However, this data transfer unit will contain different microcode sequences in its control stores than the I/O processor so as, in effect, to be a slave to the I/O processor which ultimately controls the entire I/O system 13 of FIG. 1.

In operation, when the ASYNC-SCHEDULE command is received by message and input data buffer 30 of FIG. 4 and it is determined that the device selected is a disk, primary control sequencer 31 will search the disk cache in main memory. If the operator is a READ, the primary control sequencer 31 of FIG. 4 in the I/O processor will, using the normal queuing structures, instruct its corresponding control store in the data transfer unit to transfer that data item from the disk cache in main memory to the user portion of the requesting process in main memory. If there is a miss during the search, then primary control sequencer 31 of FIG. 4 creates a new control block in its I/O work space for transfer to an appropriately selected port adaptor 24 to access the specific disk and its corresponding track and fetch the entire track back through the port adaptor to the disk cache portion of main memory. During this transfer, when the specifically selected data item has been stored in the disk cache, I/O processor unit 22 of FIG. 2 signals data transfer unit 23 to fetch that item from the disk cache and transfer it to the user portion of the requesting process in memory.

A similar reverse process is employed for a disk write. When the ASYNC-SCHEDULE command is a disk write, the I/O processor will cause a search in the disk cache to see if the corresponding disk track is stored therein, and if it is, then the I/O processor signals data transfer unit 23 of FIG. 2 to transfer that data from the user portion of main memory to the appropriate disk track and also causes an appropriate port adaptor to update the particular disk from which that disk track was fetched. Otherwise, the disk write operation is performed like any other data transfer to a peripheral unit.

EPILOGUE

An input/output system has been described for a large data processing system which includes an I/O processor with various elements and control functions therein to take over many of the I/O procedures which may thus be removed from the operating systems in main memory. The system also includes a task control processor which, in addition to scheduling various processes on different central processors, controls, and thus removes from the operating systems, external interrupts for I/O operations.

While but one embodiment of the present invention has been disclosed, it will be apparent to those skilled in the art that variations and modifications may be made therein without departing from the spirit and scope of the invention as claimed.

What is claimed is:

1. In a processing system having a plurality of central processors and a memory for storing a plurality of processes to be executed by said central processors, the combination comprising:

a task control processor providing for the scheduling of processes for execution by said central processors, said task control processor also keeping track of the status of waiting processes;

an input/output processor coupled to said central processors and to said task control processor; and a plurality of devices coupled to said input/output processor;

said central processors operating such that, when an executing process encounters an I/O operation, a corresponding input/output control block is created in said memory and an input/output instruction is initiated which is sent to said input-output processor, said input/output instruction indicating the executing process, an operation to be performed, the identity of a device, and an input/output control block in said memory;

said task control processor being responsive to the initiation of said input/output instruction to place the initiating process in a wait state until completion of said instruction by said input/output processor and to release the corresponding central processor to execute another process;

said input/output processor being responsive to an input/output instruction sent thereto to fetch the corresponding input/output control block in said memory for use in performing the indicated operation on the identified device, following which said input/output processor signals said task processor of the completion of the input/output operation;

said task control processor being responsive to the completion of an input/output operation by said input/output processor for rescheduling the corresponding waiting process for further execution when a central processor becomes available.

2. The combination of claim 1, wherein said task control processor includes event table means for allocating input/output event tokens to processes waiting for the completion of corresponding input/output operations by said input/output processor, wherein said task control processor causes an input/output event token to indicate occurrence of a corresponding event when the corresponding input/output operation has been completed by said input/output processor, and wherein said rescheduling by said task control processor occurs in response to an event token indicating completion of the corresponding input/output operation.

3. The combination of claim 1, wherein said memory contains a device table indicating the status of said devices, and wherein said input/output processor fetches said device table in performing input/output operations.

4. The combination of claim 3, wherein said task control processor includes means responsive to the status of said devices for queuing said devices for the performance of input/output operations.

5. The combination of claim 3, wherein said system includes a plurality of controllers, a plurality of peripheral units, and a plurality of buses coupling said peripheral units to various ones of said controllers and to said input/output control processor, and wherein a device may be a peripheral unit, a controller or a bus.

6. The combination of claim 5, wherein said task control processor includes a path table containing entries of various controllers that control a given peripheral unit and various buses that may be utilized to access said controllers and peripheral units, and wherein said task control processor accesses said path table to determine the paths to be used in performing input/output operations.

7. The combination of claim 1, wherein a portion of said memory is set aside as a disk cache area, wherein said devices include a plurality of disk drives, wherein said input/output processor includes caching control means cooperating with said disk cache area for caching data retrieved from said disk drives, and wherein said input/output processor operates in response to an input/output instruction which requests data from a disk drive to provide the requested data from said disk cache area if stored therein.

* * * * *